United States Patent
Shimazaki

(10) Patent No.: US 7,521,489 B2
(45) Date of Patent: Apr. 21, 2009

(54) RESIN COMPOSITION COMPRISING ANTIBACTERIAL METAL AND UTILIZING THE SAME, FURNITURE, ELECTRICAL HOUSEHOLD APPLIANCE AND MOLDING

(75) Inventor: Sataro Shimazaki, Osaka (JP)

(73) Assignee: Myu-Func. Corporation, Osaka (JP)

( * ) Notice: Subject to any disclaimer, the term of this patent is extended or adjusted under 35 U.S.C. 154(b) by 0 days.

(21) Appl. No.: 10/589,657

(22) PCT Filed: Feb. 10, 2005

(86) PCT No.: PCT/JP2005/002061

§ 371 (c)(1), (2), (4) Date: Jan. 16, 2007

(87) PCT Pub. No.: WO2005/078022

PCT Pub. Date: Aug. 25, 2005

(65) Prior Publication Data

US 2007/0190118 A1    Aug. 16, 2007

(30) Foreign Application Priority Data

Feb. 18, 2004    (JP)    .................. PCT/JP2004/001830

(51) Int. Cl.
*B32B 5/16* (2006.01)
*C09D 5/14* (2006.01)

(52) U.S. Cl. .................. 523/122; 428/327; 428/328; 428/407

(58) Field of Classification Search .................. 428/407, 428/323, 328, 327; 523/122
See application file for complete search history.

(56) References Cited

U.S. PATENT DOCUMENTS 4,911,898 A * 3/1990 Hagiwara et al. ........... 423/700
5,180,585 A * 1/1993 Jacobson et al. ........... 424/405
6,248,342 B1 * 6/2001 Trogolo et al. .............. 424/404
6,585,989 B2 * 7/2003 Herbst et al. ............... 424/404
6,982,289 B2 * 1/2006 Kuratsuji et al. ............ 523/122
7,041,723 B2 * 5/2006 Kimura ...................... 524/413
7,250,453 B2 * 7/2007 Sakuma et al. ............. 523/122
2003/0148118 A1    8/2003 Omori et al.
2004/0224586 A1    11/2004 Omori et al.

FOREIGN PATENT DOCUMENTS

| JP | 49 41436 | 4/1974 |
|----|----------|--------|
| JP | 56 158140 | 12/1981 |
| JP | 7 289359 | 11/1995 |
| JP | 10 095925 | 4/1998 |
| JP | 2002 322355 | 11/2002 |
| JP | 2003 155201 | 5/2003 |
| WO | 01 83880 | 11/2001 |

* cited by examiner

*Primary Examiner*—H. (Holly) T Le
(74) *Attorney, Agent, or Firm*—Jordan and Hamburg LLP

(57) ABSTRACT

A resin composition that excels in antibacterial action and realizes high aestheticity and safety, these properties retained for a prolonged period of time; and a relevant furniture, electrical household appliance and molding. Coating layer is superimposed on the surface of top board of table (furniture). This coating layer is formed by mixing synthetic resin with glitter and thereafter applying the mixture onto substrate of paper or wood, followed by drying. The glitter is produced by, for example, a process comprising forming a metal layer on a synthetic resin film through vapor deposition of an ion-exchangeable metal, subsequently bonding, with an adhesive, metal-clad synthetic resin films so that the metal layers come inside so as to obtain a sandwich structure and thereafter cutting the sandwich structure linearly or zigzag lengthwise and crosswise.

11 Claims, 3 Drawing Sheets

RESIN COMPOSITION COMPRISING ANTIBACTERIAL METAL AND UTILIZING THE SAME, FURNITURE, ELECTRICAL HOUSEHOLD APPLIANCE AND MOLDING

FIELD OF THE INVENTION

This invention relates to a resin composition, furniture, electrical household appliances and molded objects which have excellent antibacterial activity and aesthetic appearance, and is safe, and in which these properties are retained for a prolonged period of time.

BACKGROUND ART

In recent years, an orientation towards cleanliness has increased among consumers, particularly women, and tables, containers and the like have been required to be provided with antibacterial activity. Additionally, in hospitals, work benches with antibacterial activity are required in order to prevent in-hospital infections.

In order to meet such a demand, conventional tables, of which the surface is covered with a resin composition where an antibacterial agent or the like is kneaded into a synthetic resin (see Patent Document 1), and containers that have been formed by molding such a resin composition (see Patent Document 2) have been used.

Patent Document 1: Japanese Unexamined Patent Publication H7 (1995)-289359
Patent Document 2: Japanese Unexamined Patent Publication 2002-322355

SUMMARY OF THE INVENTION

Even though conventional tables and containers are provided with antibacterial activity, a problem arises that the contained antibacterial agent is not completely harmless to the human body. In addition, there is a problem where the antibacterial agent is lost as time passes, and the antibacterial activity decreases. Furthermore, the appearance of tables and containers, into which an antibacterial agent has been kneaded, does not become better.

Therefore, an object of this invention is to provide a resin component where a laminated film, having at least a metal layer made of antibacterial metal and synthetic resin films which cover the two sides of the metal layer, is mixed into a synthetic resin, and to provide furniture, electrical household appliances and molded objects with such a resin composition where the surface of the furniture is coated with this resin composition or the molded objects are manufactured by molding this resin composition, and thereby, excellent antibacterial activity, aesthetic appearance and safety are gained, and these properties are retained for a prolonged period of time.

In order to solve the above described problems, a resin composition according an embodiment of the invention contains a laminated film, having at least a metal layer made of antibacterial metal and synthetic resin films that coat the two sides of the metal layer, and a synthetic resin.

In addition, a resin composition according to an advantageous embodiment, the above described antibacterial metal is silver.

In addition, a resin composition according to a further embodiment of the invention, the form of the above described laminated film is any of a powder particle form, a thread form and a strip form.

In addition, a resin composition according to a feature of the invention, the elution of silver ions cannot be prevented even when the metal layer of the laminated film is completely buried in the synthetic resin, and thus, the antibacterial activity is not lost.

In addition, a resin composition according to a further feature of the invention, a spark phenomenon due to radio waves does not occur to the resin composition in which the elusion of silver ions cannot be prevented.

In addition, a resin composition according to another advantageous embodiment, the melting point and the softening point of the synthetic film that forms the resin composition are lower than the melting point and the softening point of the synthetic resin films that form the laminated film which is contained in this resin composition, and thereby, the resin composition has an aesthetic appearance with excellent metal luster.

In addition, a piece of furniture or an electrical home appliance according to another embodiment has at least a portion of the external surface coated with the resin composition according to the invention.

In addition, a molded object according to a further embodiment is formed by molding the resin composition according to the invention.

A resin composition according to the present invention, as well as furniture, electrical home appliances and molded objects using the same, have excellent antibacterial activity and aesthetic appearance and are safe, and there is an advantage such that these properties are retained for a prolonged period of time.

Furthermore, in the case where silver is used in the antibacterial metal layer that forms a laminated film of the resin composition with this metal layer being completely buried in the synthetic resin layer which forms this laminated film, there is an advantage where the elusion of silver ions cannot be prevented, and the spark phenomenon due to radio waves does not occur.

Figure 1:
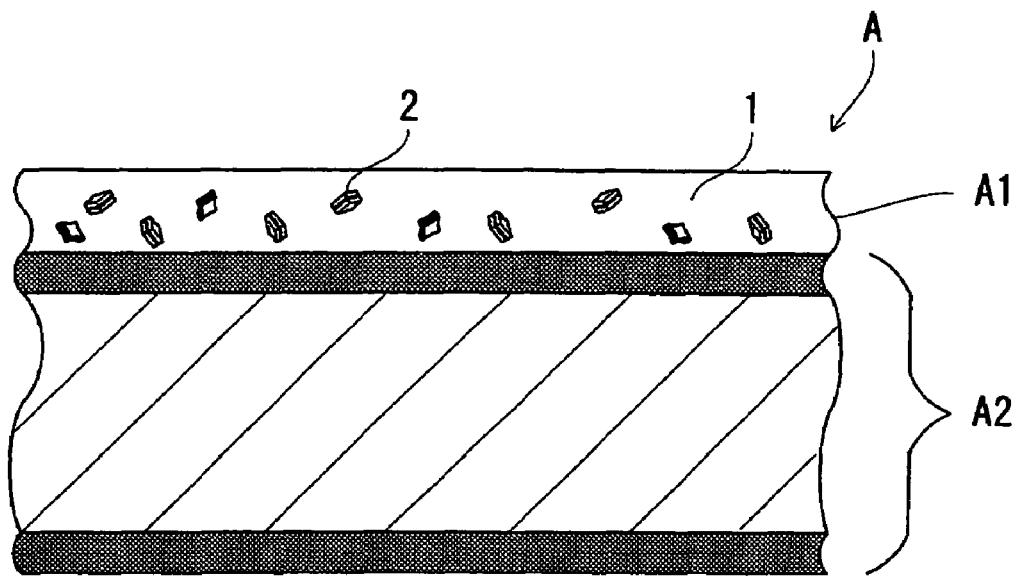
FIG. 1 is an enlarged diagram showing the configuration of a surface portion of a top board that forms a table according to this invention.

A: top board
A1: coating layer
A2: base
B: molded object
1: synthetic resin
2: glitters
2a: synthetic resin films
2b: metal layers
2c: adhesive

DETAILED DESCRIPTION OF THE INVENTION

Figure 2:
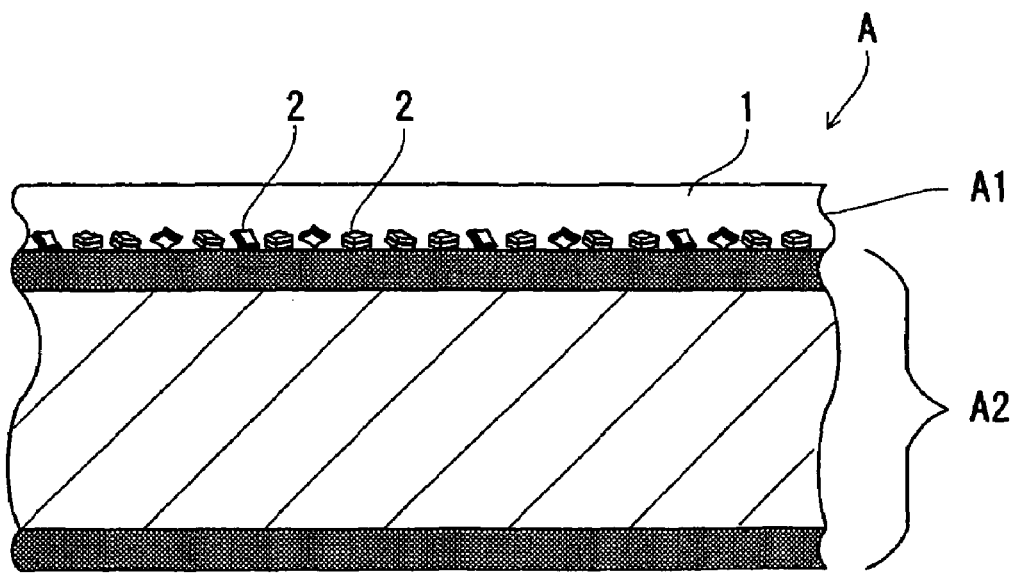
FIG. 2 is an enlarged diagram showing the configuration of a surface portion of a top board that forms another table.

FIG. 1 is an enlarged diagram showing the configuration of a surface portion of top board A that forms a table (furniture) according to this invention in a cross section in the lateral direction of top board A. As shown in this diagram, a coating layer A1 is provided on the surface of top board A. Here, coating layer A1 is formed by mixing a synthetic resin 1 and glitters 2, and after that, applying the mixture to a base A2 made of paper, wood or the like, which is then dried. In addition to this, as shown in FIG. 2, coating layer A1 can be formed by scattering glitters 2 on top of base A2, and after that, coating the surface with a synthetic resin. Here, the amount of glitters 2 is approximately 2 wt % to 10 wt % of the total weight of coating layer A1, taking the product price and antibacterial activity into consideration.

Synthetic resin 1 is not particularly limited as long as it is a synthetic resin with which base A2, which forms top board A, can be coated. Thus, polyolefin based resins such as polyethylene and polypropylene, melamine resins, acryl resins, vinyl acetate resins, urethane resins, ABS resins, polyamide resins and polyester resins can be cited as examples of the above described resin.

Here, from among these resins, resins having a melting point and a softening point that are lower than those of the synthetic resin films and the adhesive resin which form glitters 2 are preferable, taking the compatibility with glitters 2 into consideration, and in the case where the synthetic resin films are made of polyester (polyethylene terephthalate), resins such as melamine, polyethylene and polypropylene are more preferable, taking the product cost and the like into consideration. In the case where a resin of which the melting point and the softening point are equal to or higher than those of the synthetic resin films and the adhesive that form glitters 2 is used, the synthetic resin films and the adhesive are softened or melted during the process, and thus, the metal gloss is lost and the aesthetic appearance is lessened though the function is maintained, and therefore, care should be taken. In the case where the resin is polyester (polyethylene terephthalate), for example, a polyester naphthalate film can be used for glitters 2, and a resin of which the resistance to heat is higher than that of polyethylene terephthalate can be used as the resin for bonding the below described vapor deposited metal films, and thereby, the antibacterial activity and the aesthetic appearance with a metal color can be secured.

Figure 3:
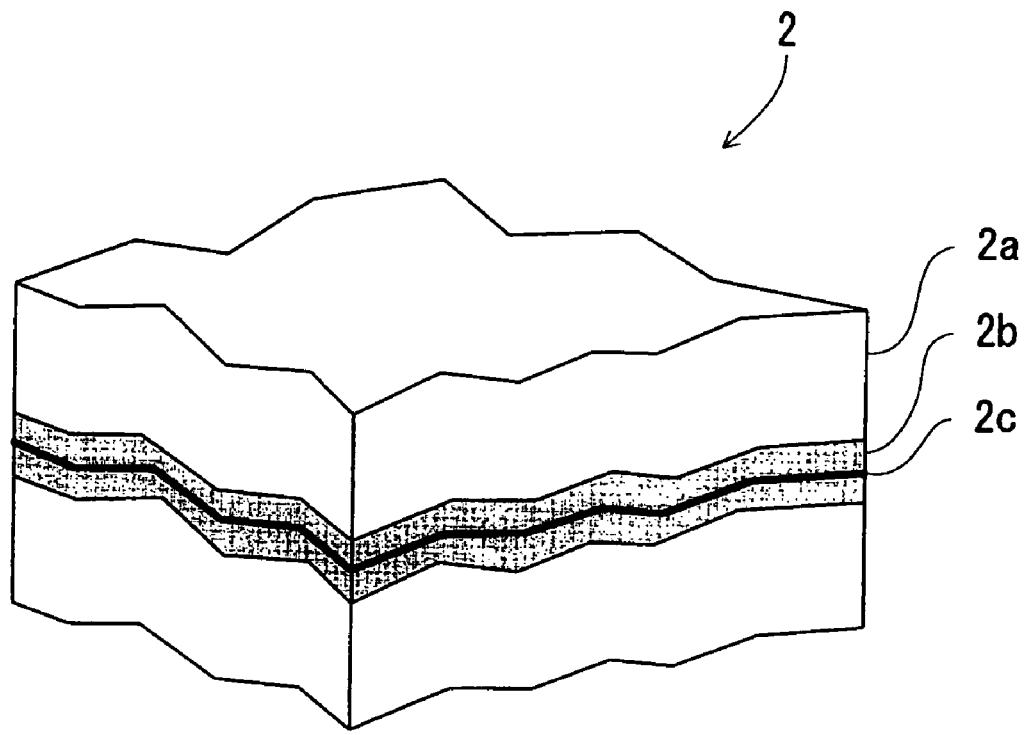
FIG. 3 is a diagram showing the configuration of a glitter.

FIG. 3 is an enlarged diagram of a glitter 2, and glitter 2 is formed of synthetic resin films 2a, metal layers 2b and an adhesive 2c, is a laminated film in approximately square form where the length of one side is approximately 0.1 mm to 1 mm, and has been cut linearly or in a zigzag so that metal layers 2b are exposed to the outside. Here, other laminated films may be used instead of glitters 2 as long as they are provided with a metal layer and synthetic resin films which coat the two sides of this metal layer.

For example, a laminated film may be one synthetic resin film layer where the metal layer side is coated with a resin compared to glitter 2, which has two metal layers 2b. In addition, a layer for coating the metal color may be provided on the surface on the side opposite to the side on which the metal layer has been vapor deposited on the synthetic resin film so that the aesthetic appearance having two or three color tones may be provided. In addition, the form of a laminated film may be a thread form or a strip form instead of an approximately square powder particle form like that of glitters 2, and the size is not particularly limited.

Such glitters 2 are manufactured, for example, by forming a metal layer 2b on a synthetic resin film 2a through the vapor deposition of an ion exchangeable metal, subsequently bonding synthetic resin films on which a metal layer has been formed to each other with an adhesive 2c so that metal layers 2b are located on the inside, and cutting this sandwich structure linearly or in a zigzag, lengthwise and crosswise.

Films made of polyester, nylon, polyethylene, polypropylene and the like can be cited as synthetic resin films 2a, of which the thickness is approximately 5 µm to 50 µm, preferably approximately 6 µm to 25 µm, taking function and product cost into consideration.

Metal layers 2b are formed of an antibacterial ion exchangeable metal, such as silver, copper or zinc, and from among these, silver, which is safe, does not change in color or rust, and has high antibacterial activity is optimal. In addition, the thickness of the metal layers is approximately 20 nm to 150 nm, and preferably, approximately 50 nm to 100 nm, taking function and product cost into consideration.

Polyurethane based adhesives, polyester based adhesives and acryl based adhesives can be cited as adhesive 2c, and polyurethane based, polyester based, acryl based or polycarbonate based adhesives are preferable.

Here, this invention is not limited to the above described embodiments, and may be modified in a variety of manners within the technical scope of the invention.

Though a table which is a piece of furniture is described as an example in the above described embodiments, in addition to this, such pieces of furniture as desks, chairs and sofas, electrical household appliances such as electrical rice cookers, electrical dishwashers, washing machines and vacuum cleaners, as well as containers and the like may be provided.

Figure 4:
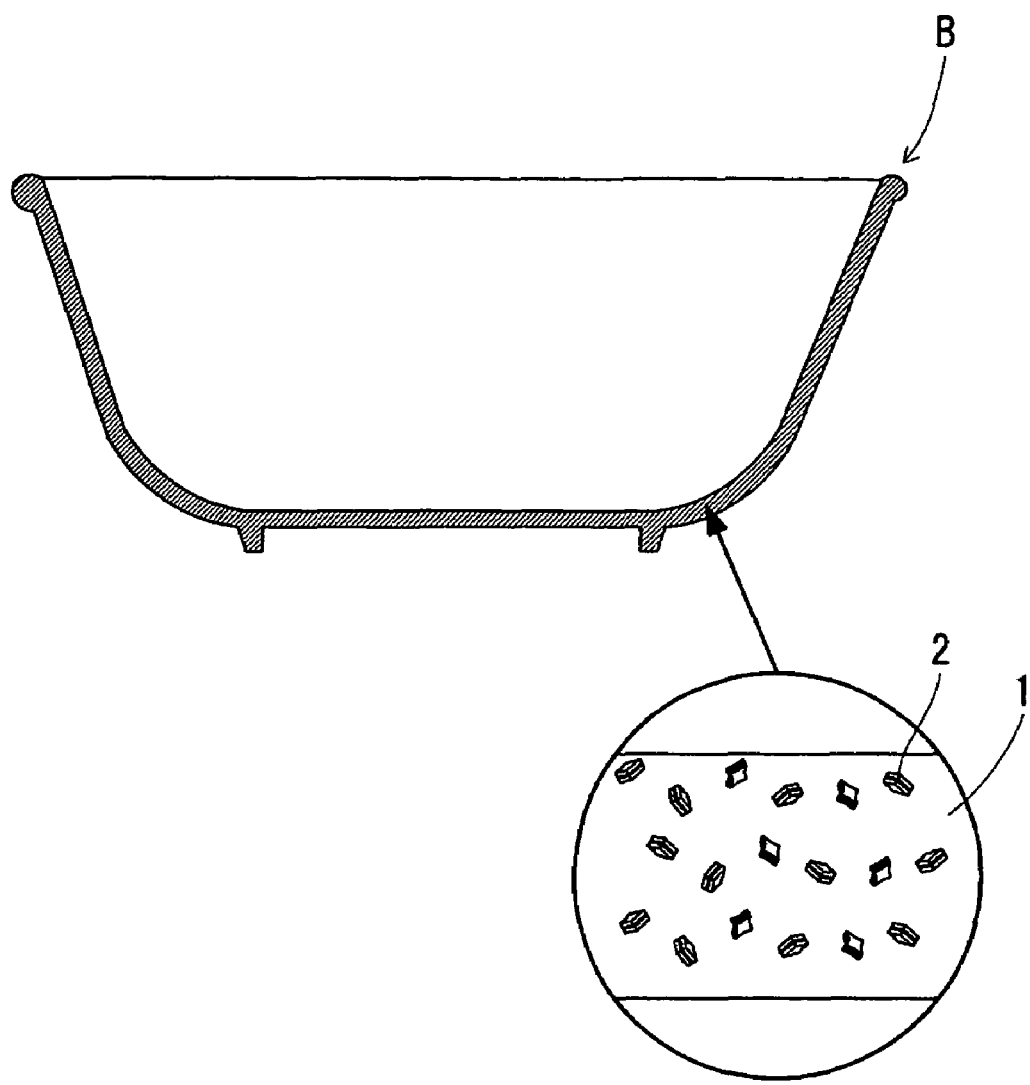
FIG. 4 is a cross sectional diagram showing a molded object according to this invention, and an enlarged diagram showing a portion of the same.

In addition, instead of coating the surface of a base with a resin composition as that described above, a molded object may be manufactured through injection molding, injection compression molding, blow molding or extrusion molding of this resin composition. In addition, FIG. 4 is an enlarged cross sectional diagram showing a portion of a molded object B (basin), and as shown in this diagram, molded object B contains glitters 2 in a synthetic resin 1. Here, the components of synthetic resin 1, the configuration of glitters 2 and the ratio of synthetic resin 1 to glitters 2 are the same as those in the above described coating layer A1, and therefore, the description thereof is omitted.

Furthermore, stationery goods, such as ballpoint pens and mechanical pencils, bath products, such as baths, basins and lids for baths, bathroom products, such as toilet seats and brushes, kitchen products, such as cutting boards, rice chests and food containers, cleaning goods, such as garbage cans and brooms, goods which are touched by an unspecified large number of people, such as hand straps in trains and public phone receivers, cartridges for water purifiers and water purifiers in bowl form which are put into cartridges and the like can be cited as examples of the above described molded objects.

EXAMPLE 1

Next, as a first example according to this invention, a surface material for the top board of a table (test piece 1) and a polypropylene plate (test piece 2) were manufactured, and a variety of tests were conducted, and using this example, this invention is described in further detail.

First, the manufacture of glitters is described. Pure silver was deposited on a polyester film having a thickness of 9 µm in accordance with an ion vapor deposition method, and thus, a metal layer having a thickness of 50 nm was formed. Next, polyester films having a metal layer as that described above were bonded to each other with a polyester based adhesive so that the metal layers were located on the inside, and thereby, a sandwich structure was manufactured. Finally, the laminated film was cut lengthwise and crosswise in a zigzag using a shredder or a cutter, so that glitters were manufactured.

Next, the manufacture of the test pieces is described. A sheet of paper to be used as a surface material for the top board of a table was colored, and glitters as those described above were scattered on top, and this was coated from the top with a melanin resin, and then, the resin was hardened, so that test piece 1 was manufactured. Here, the weight ratio of the glitters to the melanin resin was 1%, and the glitters were scattered uniformly and in a dispersed state.

In addition, glitters as those described above were dispersed and mixed into polypropylene that was melted at 170° C., so that the weight ratio of the glitters to the polypropylene became 10%, and after that, the polypropylene was left to cool, so that test piece 2 was manufactured. Here, both test pieces 1 and 2 had a beautiful silver gloss.

The test for antibacterial activity is described below.

When a test for antibacterial activity was conducted on test piece 1 in accordance with JIS Z2801 (film contact method), excellent antibacterial activity with an antibacterial activity value of 4.8 was exhibited. Here, *Staphylococcus aureus* NBRC 12732 was used as a test bacterial strain.

The silver ion elution test is described below.

When the amount of eluted silver ions was measured for test piece 2 in accordance with an ICP method used for water quality testing and the like, silver ion elution of 86 ppb was found. It is said that, biologically, microorganisms such as bacteria die at 5 ppb to 10 ppb, and thus, it was found that test piece 2 had sufficient antibacterial activity.

As a result of this, it was found that the above described glitters have antibacterial functions due to the elution of ions of an antibacterial metal within the glitters, even when buried in the synthetic resin, as long as they are dispersed or scattered uniformly and with an appropriate weight ratio in the resin. No spark was found between radio waves and the metal that is included in the glitters, even when test piece 2 was put into a microwave oven and the switch thereof turned on.

EXAMPLE 2

Next, a second example according to this invention is shown.

The present example relates to a food preserving container that is formed by molding a resin composition according to the present invention.

First, the glitters used in the present example were prepared by cutting the above described laminated film, that is to say, the sandwich structure consisted of depositing pure silver on a polyester film having a thickness of 9 μm in accordance with an ion vapor deposition method, and thereby forming a metal layer having a thickness of 50 nm and bonding polyester films having a metal layer as that described above to each other with a polyester based adhesive so that the metal layers are located on the inside, lengthwise and crosswise in a zigzag.

In addition, this container is a food preserving container (the ratio of the glitters to the total weight is approximately 1%) formed by extrusion molding a material prepared by mixing 100% of polypropylene with 5% of a master batch of polypropylene made in such a manner as to include glitters prepared from the above described laminated film at a weight ratio of 20%. In addition, when 500 ml of water was put into this container, which was then put into a microwave oven and irradiated with microwaves for three minutes, the temperature of the water rose to approximately the same level as the water in the case of a container formed 100% of polypropylene, and no sparks were found during the irradiation with microwaves.

The results prove that the glitters were completely buried in the polypropylene resin, and silver which was exposed from the cross section during the manufacture of these glitters became of a state of complete isolation from the outside.

Here, as a comparison, when a towel into which threads formed by cutting a laminated film in long and narrow form as that described above from which the glitters were made were partially weaved, was wetted and irradiated with microwaves in the same microwave oven, a lot of bluish white sparks were clearly observed in the cross section of these threads.

It is well known that sparks between a metal and microwaves cause a great loss in the heating performance of the microwave oven, and as described above, the temperature of the water rose to the same level as in the case of a container made 100% of polypropylene, and therefore, it can be said that there was no loss in the heating performance of the microwave oven, and in addition, the fact that no sparks were found during irradiation with microwaves proves that not even a portion of these glitters was exposed from the above described food preserving container.

Next, a test for measuring elution of silver ions was carried out in accordance with frameless atomic absorption spectrophotometry using this container as a sample. First, the below described four types of solutions were prepared as solvents for elution, and the pH was adjusted to 5.0 in advance using dilute hydrochloric acid.

500 ml of each of these solutions for elution was poured into a container as that described above as a sample, which was then shaken in the lateral direction for one hour at 150 rpm using a shaker, and after that, was left still for 24 hours at a room temperature of 25° C. After that, this solvent for elution was filtered using highly pure filter paper (product number "No. 5C," made by Toyo Filter Paper Co., Ltd., mass: 118 g/m$^2$, thickness: 0.22 mm, time for filtering water: 570 s, bursting strength: 78 kPa, diameter of particles filtered out: 1 μm), and thus, a sample liquid was prepared.

Here, at the time of measurement of the sample liquid: "solution of 0.1 w/v % sodium chloride," sodium chloride deposited on the frame of the atomic absorption photometer and hindered the measurement, and therefore, in pre-processing, this sample liquid was diluted five times before measurement, in order to reduce these effects.

The wavelength: 321.8 nm, which is absorbed by silver ions in the above described sample liquids, was measured in accordance with frameless atomic absorption spectrophotometry, and the following results were obtained. Here, the limit of determination was 1 ppb.

TABLE 1

| No. | Elution liquid | Concentration of eluted silver ions |
| --- | --- | --- |
| 1 | Solution of 0.1 w/v % sodium chloride | Approximately 3 ppb |
| 2 | Solution of 0.1 w/v % ammonium chloride | Less than 1 ppb |
| 3 | Solution of 0.5 w/v % ammonium chloride | 2 ppb |
| 4 | Solution of 1.0 w/v % ammonium chloride | 2 ppb |

In the table, though the actually measured value of the "solution of 0.1 w/v % sodium chloride" of No. 1 was approximately 0.5 ppb, the numerical value multiplied by a dilution factor of 5 is shown.

It can be seen from the results of the above described "No. 1" that elution of silver ions of approximately 3 ppb was found in the solution of sodium chloride having a concentration of 0.1% with 99.9% of water. Furthermore, elution of silver ions was recognized in other elution liquids. Thus, the fact that silver ions were eluted from the above described glitters which were "completely" buried in polypropylene, which is a type of plastic, was proven in this test, following the silver ion elution test in the above described example.

Here, the above described values can be increased by increasing the weight ratio of the glitters, and thus, it is easy to gain a container or the like having desired antibacterial activity. Accordingly, it is optimal to apply this example to containers or the like for containing food materials such as perishable foods of which the freshness must be preserved.

INDUSTRIAL APPLICABILITY

A resin composition, a piece of furniture, an electrical household appliance and a molded object according to this invention have excellent antibacterial activity due to an antibacterial metal which forms a laminated film, and an aesthetic appearance due to the gloss of this metal, and thus, can be used in various places where antibacterial activity is required. In addition, this antibacterial activity and aesthetic appearance are different from those using an antibacterial agent and are retained safely for a prolonged period of time, and therefore, applicability in various fields and for various products can be expected.

The invention claimed is:

1. A resin composition, comprising:
   a laminated film, having at least a metal layer made of antibacterial metal and films of a synthetic resin that cover opposing sides of the metal layer; and
   an other synthetic resin, a melting point and a softening point of said other synthetic resin being lower than a corresponding melting point and a corresponding softening point of the synthetic resin that form the laminated film.

2. The resin composition according to claim 1, wherein said antibacterial metal is silver.

3. The resin composition according to claim 2, wherein a form of said laminated film is any of a powder particle form, a thread form or a strip form.

4. The resin composition according to claim 2, wherein the elusion of silver ions cannot be prevented, and antibacterial activity is not lost even when the metal layer of the laminated film is completely buried in the synthetic resin.

5. The resin composition according to claim 2, wherein a spark phenomenon due to radio waves does not occur even when the elusion of silver ions is not prevented in the resin composition.

6. The resin composition according to claim 1 or 2, wherein the laminated film is configured by vertically cutting a structure in which the film of the synthetic resin having a vapor deposited metal side on which an antibacterial metal vapor is deposited thereto is coated with the synthetic resin on the vapor deposited metal side, or a sandwich structure obtained by adhering the film of the synthetic resin having an antibacterial metal vapor deposited film deposited thereto with another film of the synthetic resin having an other antibacterial metal vapor deposited thereto so that the metal vapor deposited films are located on an inside of the sandwich structure.

7. The resin composition according to claim 1 wherein a form of said laminated film is any of a powder particle form, a thread form or a strip form.

8. The resin composition according to claim 1, wherein the elusion of silver ions cannot be prevented, and antibacterial activity is not lost even when the metal layer of the laminated film is completely buried in the synthetic resin.

9. The resin composition according to claim 1, wherein a spark phenomenon due to radio waves does not occur even when the elusion of silver ions is not prevented in the resin composition.

10. A piece of furniture or an electrical home appliance, characterized in that at least a portion of the external surface is coated with the resin composition according to any of claims 1, 2 and 3 to 5.

11. A molded object formed by molding the resin composition according to any of claims 1, 2 and 3 to 5.

* * * * *